April 21, 1936.  A. DE MATTEIS  2,038,028
TOASTING APPARATUS
Filed Dec. 17, 1929  2 Sheets-Sheet 1
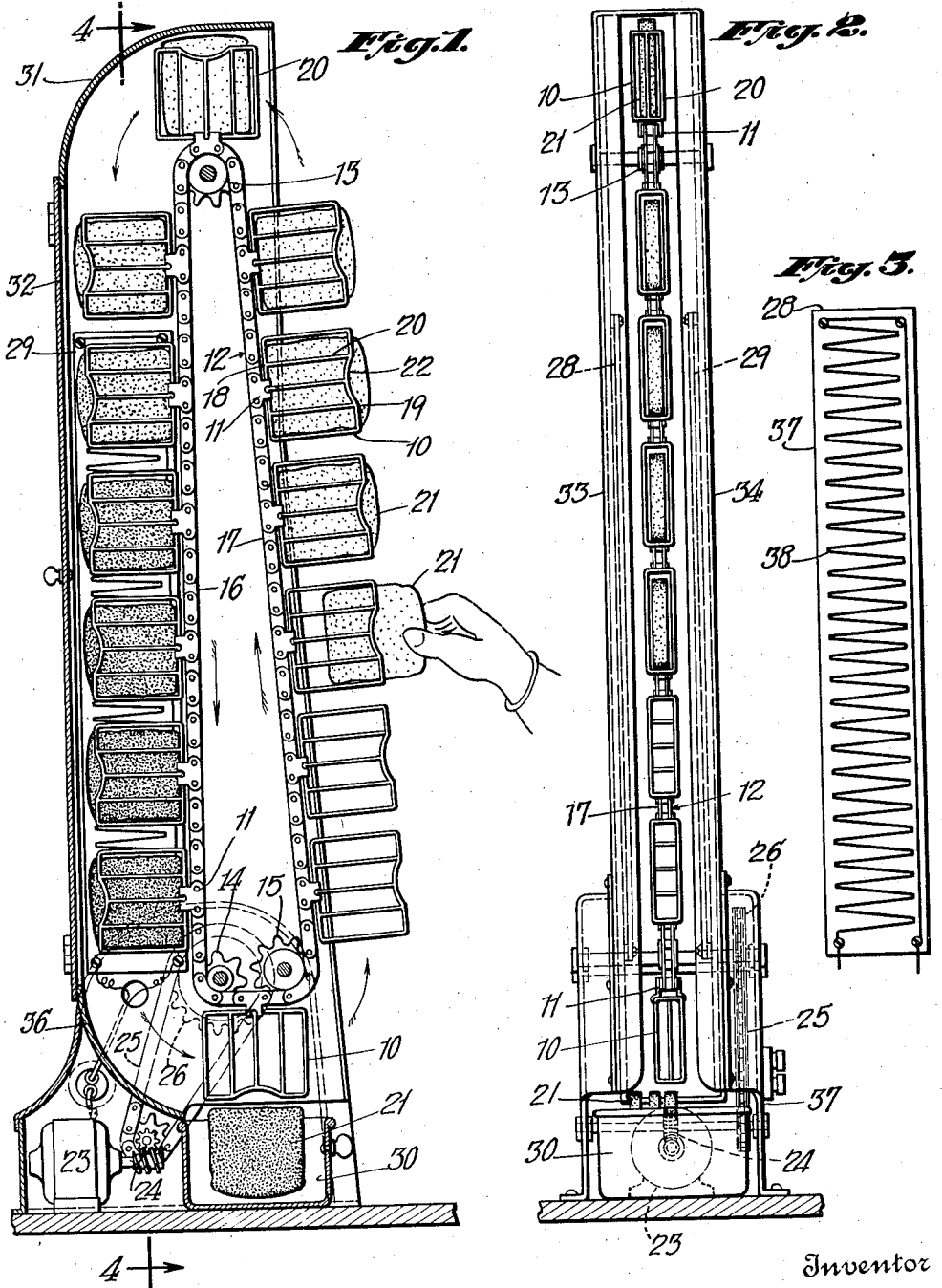
Inventor
ALFREDO DE MATTEIS.
By his Attorneys April 21, 1936.  A. DE MATTEIS  2,038,028
TOASTING APPARATUS
Filed Dec. 17, 1929   2 Sheets-Sheet 2
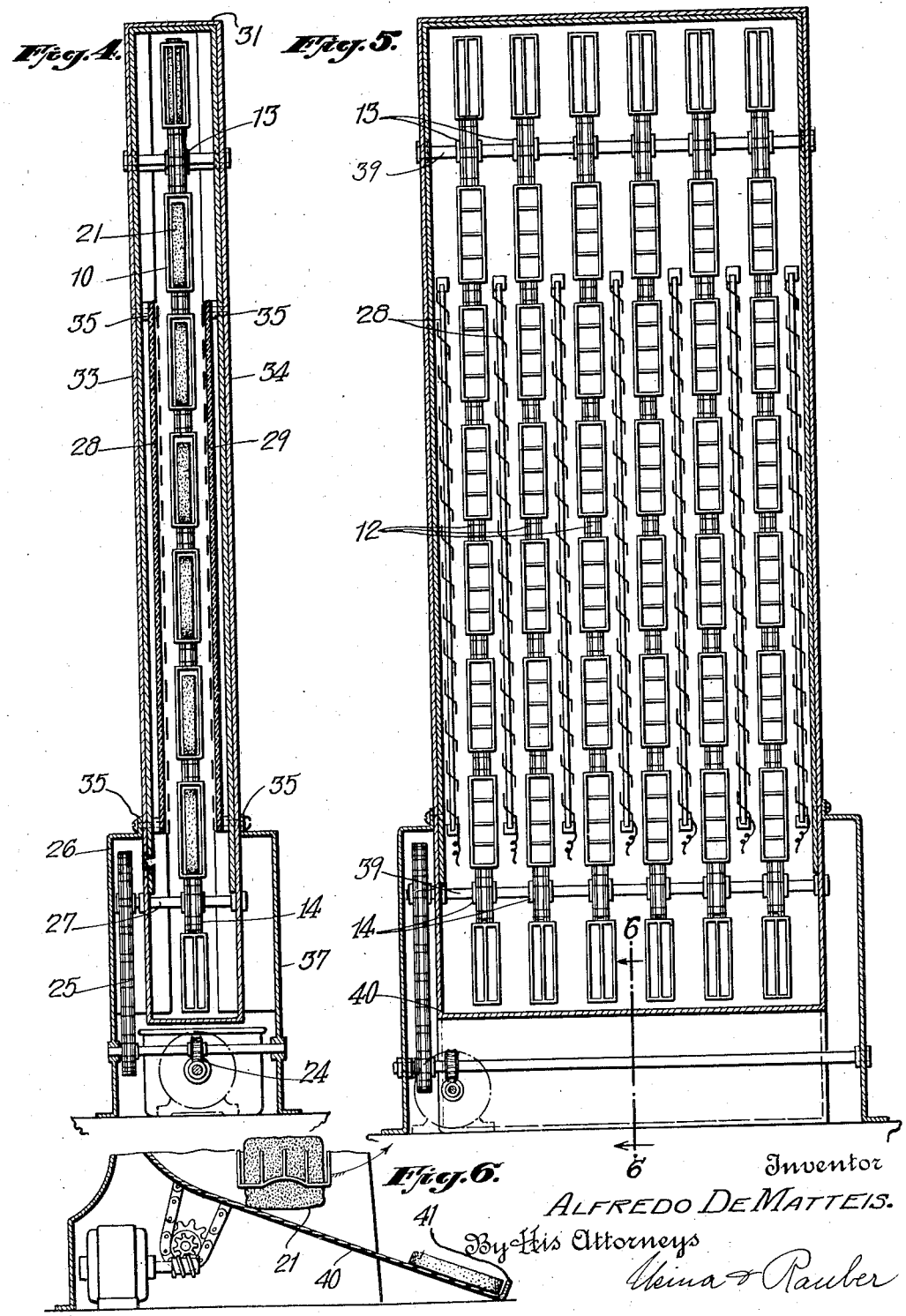
Inventor
ALFREDO DE MATTEIS.
By His Attorneys Patented Apr. 21, 1936

2,038,028

UNITED STATES PATENT OFFICE 2,038,028

TOASTING APPARATUS

Alfredo De Matteis, New York, N. Y., assignor to Republic Metalware Company, Buffalo, N. Y., a corporation of New York Application December 17, 1929, Serial No. 414,632

2 Claims. (Cl. 53—5)

This invention relates to an automatic and continuously acting apparatus for toasting slices of bread and similar materials.

The objects of the invention are to provide an apparatus in which the slices of bread to be toasted may be placed in quantities at a time, and in which the slices will be given a desired toasting effect and automatically discharged; to provide apparatus in which the slices of bread placed in the apparatus will automatically assume their proper position before toasting regardless of the accuracy with which they have been placed; to provide a machine in which the slices of bread to be toasted are securely and accurately held in position with a minimum of obstruction of the heat radiated to the slices undergoing toasting; and to provide an apparatus in which the heating effect will be most efficiently applied and in which the area occupied by the apparatus will be reduced to a minimum for a given toasting capacity.

With these and other objects in view which will more fully appear from the following description, the invention comprises the apparatus described and set forth in the following specification and claims.

The various features of the invention are illustrated in the accompanying drawings, in which—

Fig. 1 is a vertical sectional view of apparatus embodying a preferred form of the invention.

Fig. 2 is a front elevation of the apparatus taken from the right of Fig. 1.

Fig. 3 is a detail view of a heating element.

Fig. 4 is a vertical sectional view taken on line 4—4 of Fig. 1.

Fig. 5 is a vertical sectional view taken on a line similar to that of Fig. 4 of a modified form of the invention having a plurality of heating and toasting elements, and Fig. 6 is a sectional view taken on line 6—6 of Fig. 5 of a toast discharging chute.

In the present invention the slices of bread to be toasted are carried successively between spaced heaters, preferably of an electric resistance type, although gas fire heaters or other heating apparatus may be employed. The heaters are arranged in vertical planes and the slices of bread to be toasted are carried in a vertical plane between said heaters by means of narrow baskets having an open end for the insertion of the slices. The baskets are mounted at the edge opposite said open end on an endless chain which passes in a vertical plane in such a manner that at one part of its path of travel, slices of bread may be inserted in the baskets. The baskets then pass through a vertical position with the open end uppermost, thence between the heaters and, after the toasting, pass in a vertical position with the open end lowermost so that the bread is discharged therefrom by gravity. The basket then swings to a position at which a succeeding slice of bread may be inserted, there being several successive baskets in receiving position at one time so that a quantity of slices of bread may be placed in position for toasting at a single time.

Referring more particularly to the accompanying drawings, a series of baskets 10 are mounted on spaced links 11 of an endless chain 12. The chain 12 is trained over an upper supporting sprocket 13 and around a lower driving sprocket 14 and a guide sprocket 15, thereby providing an approximately vertical length 16 and a length 17 very slightly inclined from the vertical.

The baskets 10 are of open frame construction having a supporting back 18 and open top frame 19 and side wires 20 extending between the back 18 and the top frame 19. The outer ends of the baskets are, accordingly, open so that slices of bread 21 may be inserted as indicated in Fig. 1, the position of the side wires 20 being such as to permit the slices to slide freely into and out of the baskets. The edge of the frame 19 is depressed to form thumb notches 22 so that the bread may be easily inserted.

It will be apparent that a number of baskets are at a time in receiving position on the length 17 of the chain so that a number of slices of bread, up to the receiving capacity of the apparatus, may be inserted at a single time in each chain unit. The chain 12 is driven in the direction indicated by the arrows in Fig. 1 by means of driving power applied from a motor 23 to the sprocket 14 through a suitable speed reduction gear 24 of sprocket chain 25 and a sprocket wheel 26 mounted on a shaft 27 supporting the sprocket 14.

The baskets 20 accordingly rise to the level of the upper sprocket 13, then swing with the chain above the sprocket 13 to a vertical position with the opening uppermost. This ensures the dropping by gravity of the slice of bread in the basket to the bottom of the basket and places it in the proper position for toasting. As the basket then progresses beyond the sprocket 13 to the position of the vertical length of chain 16, it passes between a pair of heaters 28 and 29 and is subjected on both sides to the heat of radiation from these heaters.

The open wire construction of the baskets offers a minimum of obstruction to the radiation of the heat from the heaters 28 and 29 so that the surface of the toast is uniformly and completely browned. The heating effect of the heaters 28, 29 and the speed of the motor 23 and of the sprocket 14 are so correlated that the proper toasting effect has been accomplished by the time that the basket and its slice of toast reaches the sprocket 14. As the link 11 of the chain supporting each respective basket passes about the sprocket 14 and between the sprocket 14 and the sprocket 15, the basket 10 is swung through an angle of 90° bringing the open end lowermost so that the slice of toasted bread is free to drop out into a receiver 30, as shown in Fig. 1. The basket 10 then swings around the sprocket 15 to the position shown at the length 17 of the chain and is thus in position to receive a fresh slice of bread to be toasted.

In the above arrangement of the chain a single sprocket could be used at the lower end of the chain instead of the two sprockets 14 and 15. The two sprockets are, however, used as a convenient means of causing the two chain lengths 16 and 17 to diverge slightly towards their lower ends so that the length 17 may be given a slight incline in a direction to ensure against a slipping or falling out of the slices of bread inserted in the basket preparatory to toasting.

The baskets 10 while in the position shown on the upwardly extending length of the chain 17 are, of necessity, exposed for the reception of slices of bread to be toasted. As they swing above and pass the sprocket 13 they enter a closed chamber having an upwardly and forwardly inclined plate 31 which ensures the retention of the slices in the basket. Their further retention while passing downwardly through the length 16 is ensured by a cover plate 32 in close proximity to the open ends of the baskets, which may be in the form of a door hinged on supporting side plates 33 and 34 which enclose the sides of the apparatus and to which the heating elements 28 and 29 are secured by bolts or screws 35. The toasted slices of bread are prevented from falling out of the baskets as the latter swing, by means of a downwardly and forwardly curved plate 36, until the baskets reach a position above the receiver 30. The lower part of the apparatus is enclosed by means of an enclosure 37 having an opening for the insertion and removal of the receiver 30.

The heaters 28 and 29 may be of any suitable type. As illustrated in Fig. 3, they comprise a refractory and insulating plate or sheet 37 on which a flat coil 38 of resistance wire is mounted.

As shown in Figs. 1 and 4 the heating elements 28 and 29 need not extend to the full height of the enclosure for the downwardly passing succession of baskets. With this arrangement the excess heat given off by conduction and convection from the heater to the surrounding air is carried upwardly to the unheated part of the toaster and is given up to the down coming slices of bread, thereby giving them a toasting or drying effect and conserving the heat thus lost from the heating elements. It will be understood, however, that, if desired, the heating elements may extend to the full height of the apparatus.

The invention may be applied to a single chain and a series of baskets or, a number of spaced chains and heaters may be applied side by side to thus multiply the capacity of the apparatus as shown in Fig. 5. In this construction a number of spaced sprocket wheels similar to wheels 13, 14, and 15 are mounted on common shafts, two being shown at 39, supporting a number of chains 12 in spaced relation and having heaters 28 alternating with the chains and the baskets carried thereby. In this apparatus also, instead of the curved plate 36, a plate 40 is provided with an extended length and a stop 41 at its lower end so that the slices of toast as they are discharged from the baskets slide forwardly and are received on the plate.

As changes of construction could be made within the scope of my invention, it is intended that all matter contained in the above description or shown in the accompanying drawings shall be interpreted as illustrative and not in a limiting sense.

Having now described my invention, what I claim as new and desire to secure by Letters Patent is:

1. A toasting apparatus comprising a plurality of endless chains each so arranged as to have its path of travel in a vertical plane, baskets having their side surfaces lying in planes parallel to the planes of the paths of travel of the chains, said baskets being mounted at spaced intervals on and attached to each of said chains to carry slices of material to be toasted, said baskets being open at their edge surfaces which are opposite to the edge surfaces which are attached to said chains, and heaters arranged in interspaced relation with the chains and at each side thereof and in planes parallel to the planes of the paths of travel of the chains, said heaters being adjacent some of the baskets during part of the path of their travel and in parallel arrangement with the planes of the paths of travel of the chains.

2. In a toaster, the combination with a plurality of pairs of spaced, vertically arranged heaters having their heating surfaces arranged in vertical planes, a narrow chain adapted to move between each of said pairs of heaters and being so arranged as to have the path of travel in a vertical plane, and a plurality of narrow, flat, open-edged baskets carried by each of said chains, said baskets having one of their narrow edge surfaces attached to the chains and the opposite narrow edge surface extending outwardly from the chains, said baskets having their side surfaces lying in planes between the said planes of said elements and parallel to the planes of the paths of travel of the chains, whereby the baskets are carried through the heaters with the narrow edge surfaces advancing.

ALFREDO DE MATTEIS.